United States Patent
West et al.

(10) Patent No.: US 7,900,412 B2
(45) Date of Patent: Mar. 8, 2011

(54) SEALING MATERIAL

(75) Inventors: Colin John West, Pontypridd (GB);
Leslie John Clark, Bristol (GB)

(73) Assignee: Airbus Uk Limited, Bristol (GB)

( * ) Notice: Subject to any disclaimer, the term of this patent is extended or adjusted under 35 U.S.C. 154(b) by 1213 days.

(21) Appl. No.: 11/020,873

(22) Filed: Dec. 22, 2004

(65) Prior Publication Data

US 2005/0144874 A1 Jul. 7, 2005

(30) Foreign Application Priority Data

Dec. 23, 2003 (GB) .................................. 0329891.6

(51) Int. Cl.
*E04B 1/62* (2006.01)
(52) U.S. Cl. ........................................... 52/394; 52/395
(58) Field of Classification Search .................... 52/395, 52/464, 309.7, 309.16, 394
See application file for complete search history.

(56) References Cited

U.S. PATENT DOCUMENTS

| | | | |
|---|---|---|---|
| 2,228,779 A | 1/1941 | Pavlecka et al. | |
| 2,460,181 A | 1/1949 | Marshall | |
| 2,711,334 A | 6/1955 | Balfe | |
| 3,022,870 A | 2/1962 | John | |
| 3,276,334 A | 10/1966 | Rhodes | |
| 3,591,207 A | 7/1971 | Fisher | |
| 3,659,896 A | 5/1972 | Smith et al. | |
| 3,737,169 A | 6/1973 | Glynn | |
| 3,767,211 A | 10/1973 | Amphlett | |
| 3,767,503 A | 10/1973 | Maddalena | |
| 3,837,657 A | 9/1974 | Farnam et al. | |
| 3,873,106 A | 3/1975 | Pastelak | |
| 4,368,164 A | 1/1983 | Charon | |
| 5,244,162 A | 9/1993 | Bruce | |
| 5,297,806 A | 3/1994 | Kestly | |
| 5,702,111 A | 12/1997 | Smith | |
| 6,530,575 B2 | 3/2003 | Poquet et al. | |
| 6,719,293 B1 | 4/2004 | Coles et al. | |
| 6,857,638 B2 | 2/2005 | Dupont et al. | |
| 6,915,987 B2 | 7/2005 | Fisher et al. | |
| 7,708,281 B2 | 5/2010 | West | |
| 2002/0010223 A1 | 1/2002 | Botrie | |
| 2006/0000075 A1 | 1/2006 | West et al. | |

FOREIGN PATENT DOCUMENTS

| | | |
|---|---|---|
| DE | 1 117 803 | 11/1961 |
| DE | 2145279 | 3/1973 |
| DE | 2849991 | 5/1980 |
| EP | 0103828 | 3/1984 |
| EP | 1213127 | 6/2002 |
| EP | 1235007 | 8/2002 |
| GB | 1406539 | 9/1975 |
| JP | 2-283560 | 11/1990 |
| JP | 3-47748 | 2/1991 |

(Continued)

OTHER PUBLICATIONS

European Search Report.

(Continued)

*Primary Examiner* — Basil Katcheves
(74) *Attorney, Agent, or Firm* — Patterson Thuente Christensen Pedersen, P.A.

(57) ABSTRACT

A sealing material comprises a partially or fully cured polysulphide sealant and a reinforcing element, especially glass fibre. The sealing material is a flexible solid and is preferably in sheet form. The sealing material is cut to shape like a gasket and is assembled between components to be fastened, for example, in airframe manufacture.

18 Claims, 3 Drawing Sheets

FOREIGN PATENT DOCUMENTS

| | | |
|---|---|---|
| JP | 09059592 | 3/1997 |
| WO | WO 02/089151 | 11/2002 |
| WO | WO 03/016756 | 2/2003 |
| WO | WO 03/039851 A1 | 5/2003 |

OTHER PUBLICATIONS

Great Britain Search Report.
Yamauchi et al., "Electrically conducting sealing compositions with electro-magnetic shielding properties," Database CA 'Online!, Chemical Absracts, Columbus, Ohio, Database accession No. 124:292563, Nov. 28, 1995.
"Kirk-Othmer Dictionary of Chemical Technology," vol. 21, pp. 650-666 (1998).
"Handbook of Adhesive Technology," vol. 17, pp. 319-327 (1996).
Application and File History for U.S. Patent No. 7,708,281 issued May 4, 2010. Inventor West, at www.uspto.gov.
Application and File History for U.S. Appl. No. 12/752,667, filed Apr. 1, 2010, Inventor West, at www.uspto.gov.

SEALING MATERIAL

BACKGROUND OF THE INVENTION

The present invention relates to a sealing material and, in particular, to a sealing material for use in sealing joints in aircraft.

In the manufacture of an aircraft it is necessary to provide fluid-tight sealing in many of the joints between components, for example, to prevent fuel leakage from fuel tanks or air from pressurised cabins and to prevent water ingress into joints and consequent corrosion in those joints. Joints between components of an airframe are known as interfay joints.

The requirements for sealants used in aircraft include resistance to fuel and water, chemical compatibility with the metals and coatings used in the aircraft components and reliable maintenance of sealing performance over a wide temperature range and over the lifetime of the aircraft.

Polysulphide sealants are known for use in a range of sealing applications and, in particular, are known for use in sealing airframe interfay joints. The polysulphide sealant is typically cured via an oxidative mechanism promoted by a transition metal oxide, for example, manganese dioxide or dichromate compounds or via an organic chemical reaction, for example, epoxidation or condensation esterification. In general, the polysulphide sealants currently used in aircraft manufacture are two-component systems, with the mixing of the components being done shortly before use of the sealant (one-component polysulphide sealants are known but do not, in general, meet the demanding requirements for use in aircraft).

In aircraft manufacture, the components to be assembled into the joint will usually be of lightweight aluminium or titanium alloys or fibre-reinforced composite materials and will usually be painted prior to assembly. The joining or mating faces are first prepared by cleaning with a suitable solvent, light abrasion and wiping dry. Freshly mixed sealant is then applied directly on to at least one mating face and the components are offered together and then fastened with bolts or the like. That known method of joint assembly suffers from a number of disadvantages, including:

the premixing of the sealant components prior to use is labour-intensive, messy and requires accurate control and measurement of the levels of curing promoter in order to ensure that the period during which the sealant remains workable (the "work life") is sufficient for the planned joint assembly;

the work life and the time required to cure the sealant both depend, inter alia, on the local conditions, in particular, humidity and temperature;

application of the correct amount of liquid sealant requires skill and experience;

the joint must not be disturbed until the sealant is cured which in practice may mean that no further work can be carried out on the components for a period of several days or weeks; and during tightening of the bolts, the liquid sealant is squeezed away from the immediate vicinity of each bolt thereby allowing direct contact of the components such that subsequent relative movement of the components during the lifetime of the aircraft can cause the paint to rub off, leaving the joint vulnerable to corrosion (this is known as "fretting").

There exists a need for improved sealing materials and improved methods of joint assembly to overcome or mitigate some or all of the above-mentioned problems.

SUMMARY OF THE INVENTION

The invention provides a joint in an aircraft which includes a sealing material comprising a cured polysulphide sealant and a reinforcing element selected from the group consisting of fibre materials and mesh materials.

The invention also provides an aircraft comprising such a joint.

In a further aspect, the invention provides a sealing material for use in sealing joints in aircraft, the sealing material being in the form of a sheet comprising an at least partially-cured polysulphide sealant and a reinforcing element selected from the group consisting of fibre materials and mesh materials.

The invention further provides a sealing material for use in sealing joints in aircraft, the sealing material comprising an at least partially-cured polysulphide sealant and a reinforcing element.

The term "polysulphide sealant" as used herein refers to a composition which comprises at least one polysulphide compound and which is capable of curing to form an effective sealing material.

Polysulphide sealants are described in, for example, the Kirk-Othmer Encyclopaedia of Chemical Technology, 1998, Volume 21, pages 650-666 and the Handbook of Adhesive Technology, 1994, Volume 17, pages 319-327 (A. Pizzi). Such polysulphide sealants contain polysulphide polymers having, for example, a molecular mass in the range of 1000 to 8000 and having cross-link densities of 0.05 to 2.0 mol %. In addition to the polymer, the sealant composition will usually comprise one or more other components, for example, a curing accelerator or retarder, fillers such as calcium carbonates, calcined clays, silica and silicates and rutile titanium dioxide, a plasticizer and/or an adhesion additive. Preferably, the polysulphide sealant is a two-part formulation comprising in one part an oxidising agent as curing promoter, for example manganese dioxide or a dichromate compound.

It has been found that, even when fully cured, the polysulphide has a tendency to flow when under pressure. The reinforcing element provides strength and restricts the movement of the sealing material under the pressure induced by the tightening of fasteners in the joint. The reinforcing element, for example, glass fibre, may be introduced into the polysulphide in any suitable way. In a typical process, a two-part polysulphide composition is mixed and then coated over the reinforcing element to give a composite, the composite is pressed flat and the polysulphide is cured to give a cured polysulphide/reinforcing element composite material which can be used as a sealing material in accordance with the invention.

The sealing material can be made to the shape required or can be shaped by routine cutting and drilling. During joint assembly the sealing material is placed between the mating surfaces of the components in the manner of a gasket and the components are then fastened together, for example, with rivets or bolts. The sealing material, being already at least partially cured prior to the assembly of the joint, does not require mixing or curing time at the point of use and does not squeeze out of the joint, thereby avoiding the need to clear up squeezed out sealant as required with the current liquid polysulphide sealants. The component parts can be assembled without time constraints or problems created by disturbing uncured sealant and the consequent creation of leak paths.

The sealing material is a flexible, solid material and comes under compressive forces as the fasteners are tightened up. The compressive forces between the sealing material and the mating components promote the integrity of the seal. That contrasts to the liquid sealants in current use which flow away from areas of compression in the joint and which shrink slightly on curing thereby putting the cured sealant under tension and promoting the formation of capillary leak paths.

It has been found that, even though the polysulphide sealant is partially or fully cured before the joint is assembled, under the conditions of pressure generated by the tightening of the fasteners, the sealing material will, in general, over time adhere or bond effectively with the components.

While the sealing material is flexible and relatively soft and will to some degree move away from the fasteners as they are tightened, the at least partial curing of the polysulphide sealant and the presence of the reinforcing element will, in general, prevent the sealing material from moving entirely away from the vicinity of the fasteners, thereby avoiding direct contact of the components and the associated problem of fretting.

Conveniently, the sealing material is in the form of a sheet. Sheets of the sealing material may be made by applying the polysulphide sealant to the reinforcing element and then putting the mixture under pressure in a press and optionally at an elevated temperature while the polysulphide cures. Preferably, the sheet is of substantially uniform thickness. The desired thickness of the sheet will in general depend on the nature of the joint in which the sealing material is to be used. The sheet may be less than 4 mm thick and is optionally less than 2 mm thick. The minimum sheet thickness is largely determined by the thickness of the reinforcing element. Advantageously, the sheet is more than 0.1 mm thick and is preferably more than 0.2 mm thick.

The at least partially cured polysulphide sealant is cured to a degree where it has become a solid material which retains its shape and which can be handled and cut to shape. Typically, the sealing material is flexible and relatively soft. It is within the scope of the invention for the polysulphide sealant to be less than fully cured and for the curing to be completed after the joint is assembled. Preferably, the polysulphide sealant in the sealing material is fully cured, for example, it may be cured to the extent that its Shore hardness value is at least 95% of its maximum value. Preferably, the polysulphide sealant is cured to a Shore A hardness of at least 35° A as measured according to the ISO 7267-2 test procedure.

Two-component polysulphide sealants have been found to have superior properties when cured as compared to single-component polysulphide systems and the at least partially cured polysulphide sealant of the present invention is advantageously derived from a two component polysulphide sealant. Two-component polysulphide sealants which cure via an oxidative reaction, such as those using manganese dioxide or dichromate compounds as curing agent, are preferred.

The skilled person will be aware of polysulphide sealants currently used in aircraft manufacture and which are suitable for use in the present invention. A number of suitable polysulphide sealants are commercially available from Chemetall GmbH and PRC-DeSoto, a division of PPG Industries Inc.

The relatively soft and somewhat tacky nature of the at least partially cured polysulphide sealant makes it liable to stick to itself and to pick up dust and dirt. In order to prevent those problems, the sealing material is preferably covered with a release film, for example, a polyethylene film or a polytetrafluoroethylene film, which is removed immediately prior to use of the sealing material. In a preferred embodiment, the sealing material is in sheet form and includes a release film on both surfaces.

The reinforcing element provides strength and restricts the movement of the sealing material under pressure induced by the tightening of fasteners in the joint. Any suitable reinforcing material may be used. For example, the reinforcing element may be of glass, carbon, aramid, metal (especially stainless steel), or polyamide. The reinforcing material may be in any suitable form, for example, it may be in the form of woven fibre, non-woven fibre, or a mesh.

Glass fibre products such as woven fabrics have been found to be particularly suitable for use as the reinforcing element on account of the excellent bonding between glass and polysulphide sealants and because such products are commercially available in a range of forms and at low cost. The glass fibre material desirably has a low weight per unit area and high strength. Preferably, the glass fibre material has a weight per unit area in the range of from 50 to 200 g/m$^2$. Preferably, the glass fibre material is a woven roving. However, the glass fibre material may also be a lower-strength material such as a chopped fibre fabric.

The reinforcing element may be unidirectional, bidirectional or any other configuration, as desired. The reinforcing element may have one or more layers.

The wetting of the reinforcing element by the polysulphide sealant may be improved by treating the reinforcing element with a suitable bonding agent, adhesion promoter or cover cement. (Some grades of glass fibre are available with pre-treatments such as treatment with a silane that make them especially suitable.)

The invention also provides a method of making a sealing material in the form of a sheet for use in sealing joints in an aircraft comprising applying a polysulphide sealant to a fibre or mesh reinforcing element and allowing the polysulphide sealant to cure at least partially.

Advantageously, the reinforcing element is substantially completely covered by the polysulphide sealant and is not exposed.

The method may involve the application of pressure during the curing. The pressure may be applied using a press. Advantageously, the pressure is applied using rollers, for example, calendar rollers. In a preferred process, the reinforcing element, for example, a glass fibre roving, is passed between rollers and the uncured polysulphide is fed into the roller nip, thereby coating the reinforcing element. The combination is the passed through calendar rollers and through an oven, where the polysulphide is cured.

The curing of the polysulphide sealant may take place at ambient temperature, for example, a temperature of 40° C. or lower, especially from 0° C. to 30° C. However, the rate of curing is increased if an elevated temperature is used, for example, a temperature in the range of 40° C. to 180° C., preferably in the range of 60° C. to 120° C. The temperature of the material can be raised by using a heated press or, where the material is made using rollers, by passing the material through an oven. The polysulphide sealant is cured to the point where it can be handled and shaped.

The time taken for the polysulphide sealant to cure to the desired degree depends, inter alia, upon the local conditions, for example, the temperature, but may be in the range of from one hour to one month. The pressure may be applied during the whole of the curing period or, alternatively, the pressure may be released before the polysulphide material is fully cured. Completion of the curing may occur during storage of the sealing material or after assembly of the joint.

As mentioned above, it is desirable to cover the sealing material in a release film and therefore the method preferably includes the step of applying a release film to the outer surfaces of the at least partially-cured polysulphide sealant. The release film should be selected to prevent self-bonding during storage but not to affect adversely the adhesion and ease of use of the sealing material. Low-density polyethylene film has been found to be a suitable release film for use in the invention, allowing drilling and trimming operations with no significant problems of swarf ingress.

Shaping may be carried out prior to the curing step by using a mould or form of the desired shape in which the material is cured. Alternatively, the shaping may be carried out on the cured material, for example, by cutting or drilling.

The invention also provides a joint including a sealing material of the invention or made by a method of the invention. The joint may be a joint in an aircraft, marine craft or land-based vehicle. The joint may be any joint in an airframe where conventional wet-applied sealants are currently used, for example, a fuselage joint, a stringer joint, a glazing-unit joint, a joint in a pump or ducting and especially a joint between a wing spars, ribs and stringers and the skin which is part of an integral fuel tank.

The invention also provides a method of making a joint including the steps of assembling the components to be sealed together with the sealing material of the invention located between the mating surfaces of the components and fastening the components together.

The method may include the step of shaping the sealing material.

The method may include the step of removing release film from the sealing material.

The invention also provides an aircraft including one or more joints according to the invention.

DETAILED DESCRIPTION OF PREFERRED EMBODIMENTS

Figure 1:
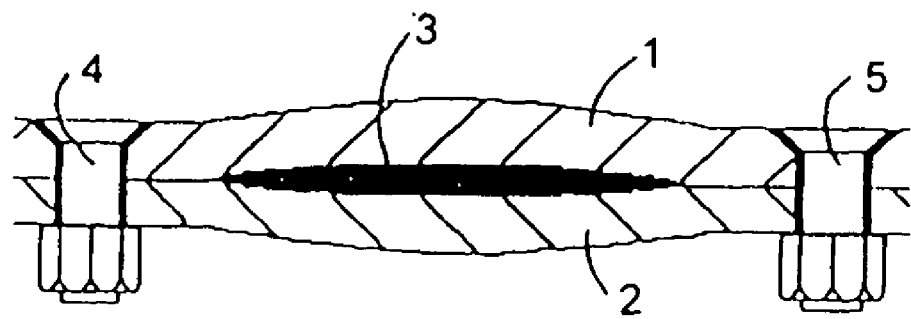
FIG. 1 shows a cross-section through part of an interfay joint sealed with a conventional liquid sealant.

FIG. 1 shows a typical joint between two pieces of painted aluminium alloy sheet 1, 2 which has been sealed with a conventional liquid polysulphide sealant 3, as follows. Firstly, the two parts of the sealant are mixed together and the mixed sealant is applied to at least one of the mating surfaces of the alloy sheets. The sheets are then pressed together carefully to ensure correct alignment and then the bolts 4, 5 are fitted in place. Upon tightening of the bolts 4, 5, the metal sheets 1, 2 in the immediate vicinity of those bolts are forced together to create an annulus around each bolt, having an approximate diameter of 1½ times the diameter of the bolt, in which the inner faces of the metal sheets 1, 2 are in contact or are separated by only a very thin film of sealant. The sealant 3 is squeezed into a pocket between those annular areas around the bolts in a process known as quilting. The region around the bolts where the sealant is thin or non-existent is prone to fretting and may also promote the formulation of a capillary leak path. Full curing of the sealant is not achieved until hours or days after the assembly of the joint during which time the piece must be left undisturbed.

Figure 2:
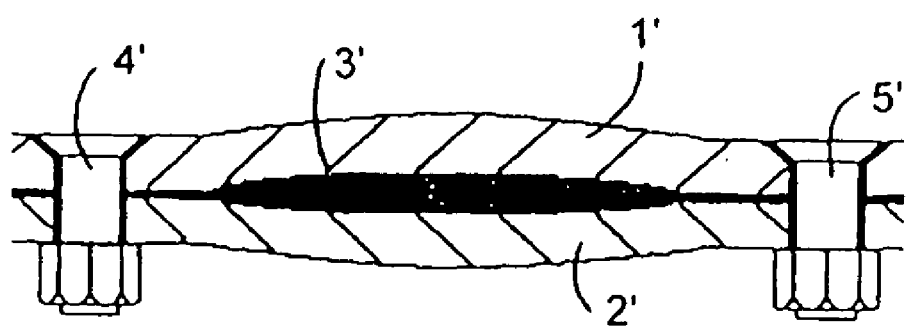
FIG. 2 shows a cross-section of a joint similar to the one shown in FIG. 1 but sealed with a sealing material according to the invention.

FIG. 2 shows a similar joint to the one shown in FIG. 1 but having a sealing material 3' according to the invention instead of the conventional liquid sealant. The joint includes two sheets of painted metal 1', 2' fastened together by bolts 4', 5'. The joint is assembled by machining the sealing material of the invention into a gasket having the shape and bolt holes required. The gasket is then placed on the upper mating surface of the lower metal sheet 2' in correct alignment with the bolt holes and the upper metal sheet 1' is placed on top. Bolts 4', 5' are then fitted and tightened. Upon tightening of the bolts, the gasket is compressed and some quilting occurs. However, a significant thickness of the sealing material remains even in the immediate vicinity of the bolts, thereby largely preventing fretting and capillary leaks. As the polysulphide sealant is already cured, there is no need to leave the joint undisturbed. Over a period of time, the sealing material bonds to the joint surfaces.

Figure 3:
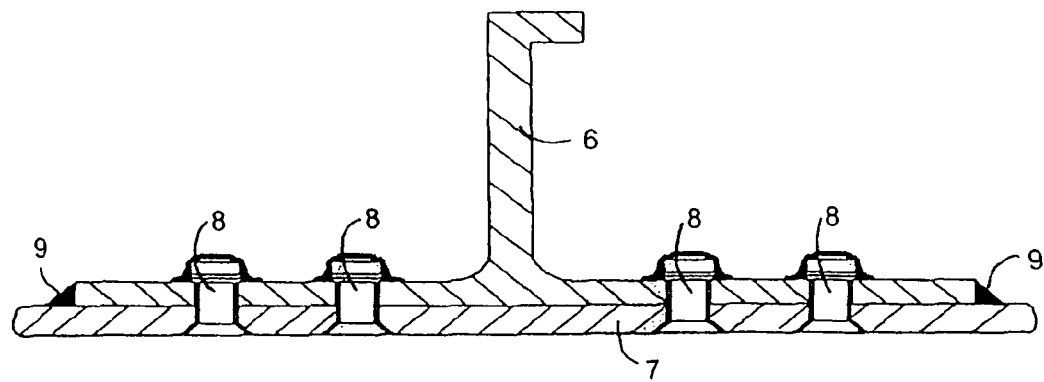
FIG. 3 shows a cross-section through an interfay joint sealed with a conventional sealant and having a filleting sealant.

FIG. 3 shows part of a joint in an airplane wing fuel tank having a stringer 6 fastened to a skin 7 by bolts 8. The stringer 6 may be up to 45 metres in length and avoidance of leaks through the joint is of critical importance. Along the edges of the stringer a conventional cold-curing liquid polysulphide sealant 9 has been applied by hand as a fillet sealant and allowed to cure. The application of the sealant is messy and labour intensive.

Figure 4:
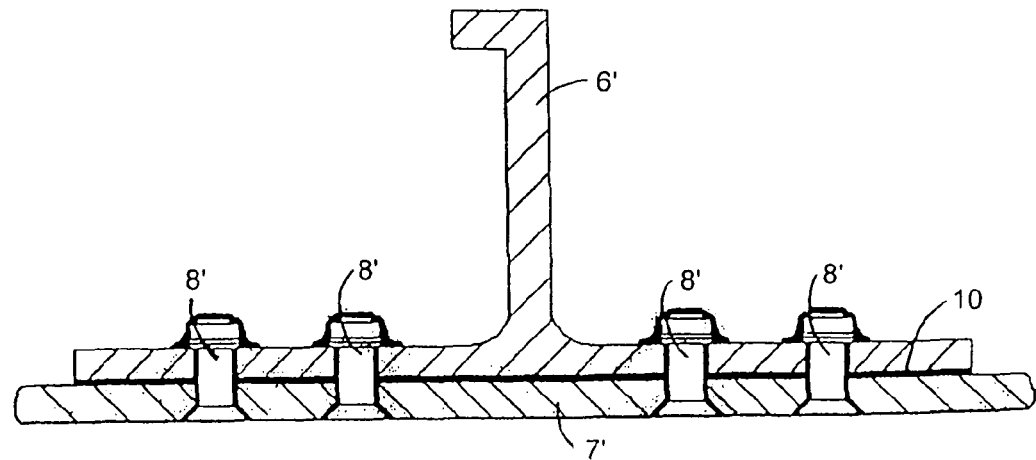
FIG. 4 shows a cross-section through an interfay joint similar to the one shown in FIG. 3 but sealed with a sealing material according to the invention and having no filleting sealant.

FIG. 4 shows a joint similar to that shown in FIG. 3 but having a sealant gasket 10 of sealing material according to the invention located between the stringer 6' and the skin 7'. The gasket is held under compression by the bolts 8' and forms an effective seal along the length of the joint with no need for a fillet sealant.

Figure 5:
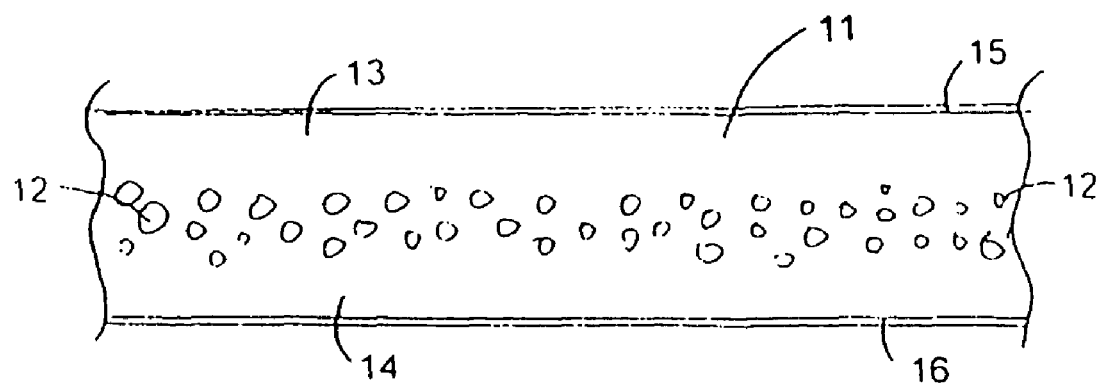
FIG. 5 shows an enlarged cross-section through a sealing material according to the invention.

FIG. 5 shows a cross-section through a sheet 11 of sealing material according to the invention having an internal layer of glass fibres 12 embedded in cured polysulphide sealant between two outer regions 13, 14 of cured polysulphide sealant. Each surface of the sheet is provided with a layer 15, 16 of release film.

Example

A conventional manganese dioxide polysulphide sealant, Chemetall MC238-A1/2 having a faster cure time than is normally used in airframe assembly (½ hour work-life grade), was mixed and evenly applied to a 200 mm×200 mm release sheet of PTFE. A 150 mm×150 mm square of 120 gram per square meter woven glass-fibre cloth of maximum thickness 0.25 mm was placed over the smoothed out sealant layer. Sealant was worked through the woven glass cloth using a plastic spatula (to remove entrapped air) and a second layer of sealant was smoothed over the glass with the spatula. A second PTFE release sheet was placed over the sealant and glass layers and the assembly was transferred to a hand press where the press was 'bumped' (opened and closed) to remove any further entrapped air and to flow the sealant to an even film thickness.

The press was clamped fully shut and left to cure. After 16 hours curing time, the press was opened and the PTFE release sheets were removed. A very high quality, void-free, glass-reinforced, polysulphide film with a thickness of 0.35 mm was produced. The film was high in tensile strength in both longitudinal and transverse directions compared to a non-reinforced polysulphide film, yet it was flexible.

This film was then cut into 25 mm×25 mm squares and these were placed between anodised aluminium alloy painted with primer, in a standard lap shear configuration and compressed to a load of 1000 kg. After compressing for two weeks the lap shear specimens were removed and subjected to loading to failure in a tensometer. A high level of bonding was observed.

Whilst the present invention has been described and illustrated with reference to a particular embodiment it will be appreciated by those of ordinary skill in the art that the invention lends itself to many different variations not illustrated herein. For that reason, reference should be made to the claims for determining the true scope of the present invention.

The invention claimed is:

1. A joint for joining two components in an aircraft, the joint including
    a fastener, and
    a sealing material in the form of a sheet comprising a cured polysulphide sealant and a reinforcing element which restricts the movement of the sealing material under pressure induced by the tightening of a fastener, the sealing material disposed so that the fastener passes through the sheet such that a significant thickness of the sealing material remains between the two components, after the fastener has been tightened, said reinforcing element selected from the group consisting of fibre materials and mesh materials.

2. A joint as claimed in claim 1 in which the reinforcing element is a fibre material selected from glass fibre, carbon fibre, aramid fibre, metal wool or mesh or polyamide fibre or mesh.

3. A joint as claimed in claim 1 in which the reinforcing element is glass fibre.

4. A joint as claimed in claim 1 which is a joint in an aircraft wing.

5. An aircraft including a joint as claimed in claim 1.

6. A joint as claimed in claim 1 in which the cured polysulphide sealant penetrates into and contacts the fibre or mesh reinforcing element.

7. An aircraft comprising a joint as claimed in claim 1.

8. An aircraft as claimed claim 7 in which the joint is between wing spars, ribs and stringers and the skin which is part of an integral fuel tank.

9. A sealing material for use in sealing joints in aircraft, the sealing material being in the form of a sheet comprising
    an at least partially-cured polysulphide sealant, and
    a reinforcing element which restricts the movement of the sealing material under pressure induced by the tightening of a fastener wherein said fastener passes through the sealing material, such that a significant thickness of the sheet sealing material remains between two components, after the fastener has been tightened, said reinforcing element selected from the group consisting of fibre materials and mesh materials.

10. A sealing material as claimed in claim 9 in which the sheet is less than 4 mm thick.

11. A sealing material as claimed in claim 9 in which the polysulphide sealant is essentially fully cured.

12. A sealing material as claimed in claim 9 in which the polysulphide sealant is a two-component polysulphide sealant.

13. A sealing material as claimed in claim 9 which also includes a release film.

14. A sealing material as claimed in claim 9 in which the reinforcing element is of glass fibre, carbon fibre, aramid fibre, metal wool or mesh or polyamide fibre or mesh.

15. A sealing material as claimed in claim 14 in which the reinforcing element is glass fibre fabric.

16. A sealing material as claimed in claim 15 which comprises a single layer of glass fibre fabric.

17. A joint for joining two components in an aircraft, the joint including
    a fastener, and
    a sealing material comprising an essentially fully cured polysulphide sealant such that it has a Shore A hardness of at least 35° A, and a woven fibre reinforcing element which restricts the movement of the sealing material under pressure induced by the tightening of a fastener, said fastener passing through the sealing material such that a significant thickness of the sealing material remains between the two components, after the fastener has been tightened.

18. A sealing material for use in sealing joints in an aircraft, the sealing material comprising:
    an essentially fully cured polysulphide sealant such that it has a Shore A hardness of at least 35° A, and
    a woven fibre reinforcing element which restricts the movement of the sealing material under pressure induced by the tightening of a fastener, said fastener passing through the sealing material such that a significant thickness of the sealing material remains between two components, after the fastener has been tightened.

* * * * *